United States Patent [19]

Toride et al.

[11] Patent Number: 5,552,145
[45] Date of Patent: Sep. 3, 1996

[54] FEED COMPOSITION AND A METHOD FOR DECREASING PIGLET MORTALITY IN PIGLETS

[75] Inventors: Yasuhiko Toride, Tokyo; Norimasa Onishi, Kawasaki; Yoichiro Togashi, Tokyo, all of Japan

[73] Assignee: Ajinomoto Co., Inc., Tokyo, Japan

[21] Appl. No.: 979,885

[22] Filed: Nov. 23, 1992

[30] Foreign Application Priority Data

Apr. 6, 1992 [JP] Japan .................................. 4-082586

[51] Int. Cl.$^6$ .......................... A61K 39/05; A61K 39/07; C12N 13/00
[52] U.S. Cl. .................................. 424/245.1; 424/234.1; 424/246.1; 424/825; 435/173.7
[58] Field of Search .................... 424/92, 246.1, 424/245.1, 173.7, 234.1, 825; 435/252.31, 252.32, 173

[56] References Cited

U.S. PATENT DOCUMENTS

| | | | |
|---|---|---|---|
| 4,237,115 | 12/1980 | Brinton, Jr. | 424/242.1 |
| 4,298,597 | 11/1981 | Acres et al. | 424/241.1 |
| 4,341,763 | 7/1982 | Zygraich | 424/215.1 |
| 4,981,685 | 1/1991 | Healey | 424/203.1 |
| 5,073,367 | 12/1991 | Nguyen | 424/93.462 |
| 5,268,357 | 12/1993 | Yabiki et al. | 514/8 |

FOREIGN PATENT DOCUMENTS 0342111  11/1989  European Pat. Off. .
0416892   3/1991  European Pat. Off. .

OTHER PUBLICATIONS

Alliger H., "Ultrasonic Disruption", American Laboratory Oct. 1975.
Jenny et al, "Performance and Fecal Flora of Calves Fed a *Bacillus subtilis* concentrate," J Dairy Sci 74 (6):1968–1973, 1991.
Schweinewelt, vol. 12, No. 1, 1987, Dr. Dietrich Kahrs, "Toyocerin in der Schweineproduktion", pp. 5–8.
Gialdroni–Grassi et al Int Arch Appl Immunol 76 Suppl 1:119–127, 1985.
Kirkbride et al, J Am Vet Med Assoc 172(4):480–483, 1978.
Benedettini et al, Boll Ist Sieroten M. lan 62(6):507–516, 1983.

*Primary Examiner*—James C. Housel
*Assistant Examiner*—Julie Krsek-Staples
*Attorney, Agent, or Firm*—Oblon, Spivak, McClelland, Maier & Neustadt, P.C.

[57] ABSTRACT

Administering a feed composition, containing at least one member selected from the group consisting of sterilized bacterial cells; disrupted cell fragments obtained by mechanical disruption or enzymatic decomposition of the cells and cell wall component-containing fractions obtained by fractionation of the disrupted cell fragments, to pregnant sows and mother sows results in a reduction in stillborn piglets, a decrease in mortality during the breast-feeding period, a reduction in the occurrence of diarrhea during the breast-feeding period, and an increase in body weight of piglets.

13 Claims, No Drawings

FEED COMPOSITION AND A METHOD FOR DECREASING PIGLET MORTALITY IN PIGLETS

BACKGROUND OF THE INVENTION

1. Field of the Invention

The present invention pertains to a method of nourishing a mother sow or a pregnant sow, to a method for reducing diarrhea in piglets, to a method of decreasing piglet mortality at birth and to a feed composition for a mother sow or a pregnant sow. More specifically, the present invention pertains to a method of nourishing a mother sow or a pregnant sow and a feed composition, which decrease piglet mortality at birth, reduce the occurrence of diarrhea in piglets during the breast-feeding period, reduce piglet mortality during the breast-feeding period, and increase the body weight of piglets.

2. Discussion of the Background

Alvine flux (diarrhea) in piglets during the breast-feeding period is a severe problem for hog breeders. Piglet mortality resulting from diarrhea during the period from birth to about 4 weeks (corresponding to the period of breast-feeding) is significant. Even if the piglets do not die from such diarrhea, it is known that such diarrhea has a deleterious influence on the growth of piglets, especially on body weight increase, and that this effect continues long beyond the breast-feeding period. These phenomena result in large losses and damages to hog breeders and are a serious problem in pig farming.

Previously, administration of a feed composition to piglets to prevent and cure diarrhea during the breast-feeding period had been disclosed (Japanese Patent Application Laid-Open No. 3-173826). This composition is efficiently mass-produced and handled with ease. Moreover, it displays an excellent preventative and curative effect upon diarrhea, presumably as a result of immunoactivation of the piglet's immune system. However, this composition is administered to piglets and, therefore, has no effect upon the significant number of stillbirths observed with piglets.

A number of approaches to lower the number of stillborn pigs are known. Feeding a pregnant sow either garlic powder or licorice powder, materials known as physiologically active substances, results in an increase in the birth number of a litter of piglets (Journal of Japan Pig Farming Association, Vol. 28, No. 3, p. 225, 1991). Here, however, the birth number obtained with mother sows fed with these materials is 11.3 heads on average, while that of the control group is 10.4 heads on average. Thus, the increase in birth number is less than one head per litter.

Additionally, it has been reported that feeding the live microbial agent Toyocerin (registered trade name, Toyo Jozo Co.) to mother sows results in reduced mortality of piglets during the breast-feeding period. Here the number of a litter of shoats per mother sow fed with the agent is higher than that in the control group (Data for Public Relations of Toyocerin, Edition for Overseas Information, published by Toyo Jozo Co.). Here, however, the percentage increase in the number of a litter of the shoats is only 3 to 6%.

Thus, there remains a need for a method of nourishing a mother sow or a pregnant sow which decreases piglet mortality at birth, reduces the occurrence of diarrhea in piglets during the breast-feeding period, reduces the piglet mortality during the breast-feeding period, and increases the body weight of piglets.

SUMMARY OF THE INVENTION

Accordingly, one object of the present invention is to provide a novel method of nourishing a mother sow or a pregnant sow.

It is another object of the present invention to provide a method for reducing piglet mortality during birth.

It is another object of the present invention to provide a method for reducing the occurrence of diarrhea in piglets.

It is another object of the present invention to provide a method for reducing piglet mortality during the breast-feeding period, when they are weakly resistant to environmental variation.

It is another object of the present invention to provide a method for promoting an increase in the body weight of piglets.

It is another object of the present invention to provide a feed composition for mother sows and pregnant sows.

These and other objects, which will become apparent from the following specification, have been achieved by the present method comprising feeding pregnant sows or mother sows with a feed composition containing at least one component selected from the group consisting of sterilized bacterial cells, disrupted cell fragments, and cell wall component-containing fractions. The mortality of piglets from the thus fed pregnant sows during the birth is reduced, the mortality of piglets during the breastfeeding period is decreased and the percentage of piglets suffering from diarrhea is also lowered during the breast-feeding period. Such results had not been achieved in the prior art.

DETAILED DESCRIPTION OF THE PREFERRED EMBODIMENT

Specifically, the present invention provides a method for nourishing mother sows and pregnant sows which reduces piglet mortality and decreases the occurrence of diarrhea in piglets. This method comprises feeding pregnant sows and mother sows a feed composition which contains at least one component selected from the group consisting of sterilized bacterial cells; disrupted cell fragments obtained by mechanical disruption or enzymatic decomposition of the cells; and cell wall component-containing fractions obtained by fractionation of the disrupted cell fragments. Such a feed composition is fed to pregnant sows to reduce piglet mortality during birth and is fed to mother sows to reduce piglet mortality during the breastfeeding period and to prevent diarrhea in piglets during the breast-feeding period, thereby promoting an increase in body weight during breast-feeding and afterwards.

The bacteria used in the feed composition for pregnant sows and mother sows of the present invention are preferably aerobic bacteria which can be prepared in large amounts with ease. However, anaerobic bacteria may also be used. Specifically, the bacteria used in the feed composition include bacteria of the genus Bacillus, such as, *Bacillus subtilis* ATCC 13952; those of the genus Brevibacterium, such as, *Brevibacterium lactofermentum* ATCC 13869, *Brevibacterium flavum* ATCC 14067 and *Brevibacterium divaricatum* ATCC 14020; and those of the genus Corynebacterium, such as, *Corynebacterium glutamicum* ATCC 13032 and ATCC 13060 and *Corynebacterium acetoacidophilum* ATCC 13870. A mixture of one or more strains of bacteria may also be used in the present invention.

To obtain such bacterial cells, the bacteria can be cultivated in any medium containing nutrient sources which are assimilated by the bacteria. For instance, any ordinary cultivating medium may be employed, which contains carbon sources including carbohydrates, such as, glucose and sucrose; alcohols, such as, ethanol and glycerol; organic acids, such as, acetic acid and propionic acid; and soybean oil, or mixtures of such carbon sources; nitrogen-containing organic and inorganic nutrient sources, such as, yeast extract, peptone, meat broth, corn steep liquor, ammonium sulfate and ammonia; inorganic nutrient sources such as phosphates, magnesium, iron, manganese and potassium; and vitamins, such as, biotin and thiamine. The aerobic bacteria can be aerobically cultivated in a nutrient medium having a pH range of from 4.0 to 9.5 at a temperature from 20° to 40° C. for a period from 12 hours to 5 days. For anaerobic bacteria, the cultivation can be carried out under similar conditions, except that the cells will be anaerobically cultivated.

The bacterial cells obtained by cultivation are isolated from the medium and sterilized by heat-treatment. Conventional heat-sterilization techniques may be employed, such as, steam sterilization and dry-heat sterilization. Such procedures are described in *Kirk-Othmer Encyclopedia of Chemical Technology*, vol. 21, pp. 626–644, John Wiley & Sons, 1983. The resultant sterilized cells may be used directly in preparing the composition of the present invention. However, the cells are preferably disrupted. To disrupt the bacterial cells, either mechanical disruption or enzymatic degradation may be employed. Mechanical disruption of the cells may be achieved, for example, by use of an ultrasonic disrupter, a bead mixer or a French press. Enzymatic degradation of the cells may be achieved by suspending the cultivated bacterial cells or the mechanically disrupted cell fragments in physiological saline, to which an enzyme capable of lysing the cell wall is added to digest the cell wall. The enzyme used for this purpose may be any enzyme capable of dissolving the cell wall. Representative examples include lysozyme and protease. Known methods and conditions for the enzymatic treatment may be used. In either the mechanical process or the enzymatic process, it is preferred that the percentage of disrupted cells is 20% or more. To promote disruption, it is preferred to use the mechanical process and the enzymatic process in combination.

The disrupted cell fragments may be fractionated to obtain cell wall component-containing fractions. The fractionation may be effected by centrifuging the fragments to remove insoluble substances. If desired, any other known method for molecular fractionation of proteins may also be employed, including, for example, ultrafiltration and gel permeation. The fractions thus obtained by fractionation of the disrupted cell fragments may also be used for preparing the feed composition of the present invention.

The feed composition of the present invention, that is, the prepared cells, the disrupted cell fragments, or the cell wall component-containing fractions, may be given orally in the form of a liquid, generally in aqueous liquid; or, if necessary and desired, the composition may be dried to a powdery form, which is added to the feed.

The feed composition of the present method may be prepared by adding the prepared cells, the disrupted cell fragments or the cell wall component-containing fractions to an ordinary feed for pregnant sows and mother sows. The prepared cells, the disrupted cell fragments, and the cell wall component-containing fractions have been demonstrated to possess an excellent immunoactivating effect in mouse spleen cells (Japanese Patent Application Laid-Open No. 3-173826).

The amount of the prepared cells, disrupted cell fragments, and cell wall component-containing fractions added to the feed is preferably 0.005 to 0.5% by weight, especially preferably 0.01 to 0.05% by weight.

The other components constituting the feed composition for pregnant sows and mother sows administered in the present invention are not specifically defined. For instance, the composition may contain from 10 to 25% by weight of crude proteins and from 1 to 10% by weight of crude fats. The metabolic energy of the composition is preferably 2000 to 4000 kcal/kg.

The present invention is characterized by feeding the above-mentioned feed composition to pregnant sows and mother sows. Such feeding may be carried out either continuously or discontinuously. The period of the feeding may be before farrowing, preferably at least one week before farrowing, to at least up to farrowing, more preferably at least up to the end of the breast-feeding period.

EXAMPLES

Other features of the invention will become apparent in the course of the following descriptions of exemplary embodiments which are given for illustration of the invention and are not intended to be limiting thereof.

EXAMPLE 1

(1) Preparation of Bacterial Cells 50 ml of a medium (pH 7), comprising 1.0 g/dl of glucose, 1.0 g/dl of yeast extract, 1.0 g/liter of peptone, 0.5 g/dl of $(NH_4)_2SO_4$, 0.3 g/dl of $K_2HPO_4$, 0.1 g/dl of $KH_2PO_4$ and 0.05 g/dl of $MgSO_4.7H_2O$, were placed in a 500 ml-flask and sterilized under heat at 115° C. for 15 minutes. To this was inoculated one loopful in each of cells from cultures of *Bacillus subtilis* ATCC 13952, *Brevibacterium lactofermentum* ATCC 13869 and *Corynebacterium glutamicum* ATCC 13032, which had been previously cultivated on a bouillon-agar medium at 30° C. for one day. These were then shake cultured in the medium at 30° C. for 24 hours. After cultivation, the respective cultures were centrifuged to collect the cells. The cells were then suspended in an equal volume of physiological saline and sterilized under heat at 100° C. for 10 minutes. The suspension was again centrifuged to collect the cells.

The weight of the thus obtained wet cells per 100 ml of the medium is shown in Table 1 below.

TABLE 1

| | Weight of Wet Cells (g/100 ml) |
|---|---|
| *Bacillus subtilis* ATCC 13952 | 4.2 |
| *Brevibacterium lactofermentum* ATCC 13869 | 5.6 |
| *Corynebacterium glutamicum* ATCC 13032 | 5.4 |

(2) Preparation of Cell Fragments by Mechanical Disruption

The wet cells prepared in (1) were suspended in 25 mM phosphate buffer (pH 7.0) to give a 10 wt. % suspension. The cell suspension was placed in a 50 ml stainless steel bottle and treated with an ultrasonic disrupter (UR-200P Model, manufactured by Tomy Seiko Co.) at an oscillating frequency of 20 kHz and a power of 200 W. After ultrasonic treatment, the mixture was centrifuged to provide the disrupted cell fragments resulting from the mechanical disruption. The cell fragments were then dried.

(3) Preparation of Cell Fragments by Enzymatic Decomposition

To a 25 mM phosphate buffer (pH 7.0) containing 10% by weight of the wet bacterial cells prepared in (1), were added 0.01% by weight of egg white lysozyme (Sigma Co.) and 0.02% by weight of ACTINASE (70,000 units, Kaken Pharmaceutical Co.). Enzymatic treatment then proceeded at 37° C. for 12 hours. The resultant mixture was heated at 100° C. for 2 minutes to deactivate the enzymes. The mixture was then dried.

EXAMPLE 2

To a nutrient composition for pregnant sows and mother sows, were added the cell fragments as prepared in (1), (2) or (3) in an amount of 0.01 or 0.05% by weight, respectively. Thus, feed compositions for pregnant sows and mother sows were prepared. The composition of the basic feed for pregnant sows and mother sows (hereinafter referred to as "basic feed") is provided in Table 2.

TABLE 2

Composition of Basic Feed for Mother Sows

|  | Content (wt. %) |
| --- | --- |
| Components |  |
| Unpolished rice | 10.000 |
| Rice bran | 37.500 |
| Corn | 22.203 |
| Soybean lees (48%) | 11.689 |
| Fish powder (51%) | 5.275 |
| Palm kernel oil | 10.000 |
| Calcium carbonate | 1.654 |
| Animal fats and oils | 0.307 |
| Premix (during breast-feeding period) | 0.500 |
| Salt | 0.601 |
| DL-methionine | 0.030 |
| L-lysine hydrochloride | 0.241 |
| Values of Nutrient Components |  |
| Metabolic energy (kcal/kg) | 3100 |
| Crude proteins (%) | 16.80 |
| Crude saturated fatty acids (%) | 2.35 |
| Crude unsaturated fatty acids (%) | 8.48 |
| Crude fibers (%) | 6.26 |
| Calcium (%) | 1.15 |
| Lysine (%) | 1.00 |
| Effective lysine (%) | 0.78 |
| S-containing amino acids (%) | 0.60 |
| Tryptophan (%) | 0.19 |
| Threonine (%) | 0.60 |
| Total phosphorus (%) | 0.95 |
| Effective phosphorus (%) | 0.41 |
| Salt (%) | 0.70 |
| Water (%) | 11.62 |

EXAMPLE 3

Using feed compositions for pregnant sows and mother sows, each containing one component selected from the group of the enzymatically digested cell fragments of *Brevibacterium lactofermentum* ATCC 13869, mechanically disrupted cell fragments of *Corynebacterium glutamicum* ATCC 13032 and sterilized cells of *Bacillus subtilis* ATCC 13952 in an amount of 0.01% by weight or 0.05% by weight (hereinafter referred to as 0.01% Brevibacterium-containing feed, 0.05% Brevibacterium-containing feed, 0.01% Corynebacterium-containing feed, 0.05% Corynebacterium-containing feed, 0.01% Bacillus-containing feed and 0.05% Bacillus- containing feed, respectively), the following experiments were carried out.

28 mother sows of 2 to 6 time-multiparous Landrace females, pregnant as a result of crossing with Large White males, were grouped into 7 groups, each comprising four mother sows. They were fed with one feed composition selected from the group of the basic feed, 0.01% Brevibacterium-containing feed, 0.05% Brevibacterium-containing feed, 0.01% Corynebacterium-containing feed, 0.05% Corynebacterium-containing feed, 0.01% Bacillus-containing feed and 0.05% Bacillus-containing feed, for a period of one week before farrow to 25 days after farrowing. The increase in body weight of the piglets and the occurrence of diarrhea, if any, was monitored for a period of 25 days after farrow. The results are presented in Table 3.

TABLE 3

| Feed | 0.01%-Brevi. feed | 0.05%-Brevi. feed | 0.01%-Coryne. feed | 0.05%-Coryne. feed |
| --- | --- | --- | --- | --- |
| Number of mother sows (heads) | 4 | 4 | 4 | 4 |
| Period of Breast-feeding of piglets (days) | 25 | 25 | 25 | 25 |
| Mean body weight of each piglet at the start of the test (kg/head) | 1.508 | 1.480 | 1.492 | 1.438 |
| Mean body weight of each piglet at the end of the test (kg/head) | 7.863 | 6.755 | 6.845 | 6.953 |
| Mean increase in body weight (kg/head/day) | 0.254 | 0.211 | 0.214 | 0.220 |
| Percentage of piglets suffering from diarrhea (%) | 7.5 | 10.0 | 9.5 | 9.0 |

| Feed | 0.01%-Bacillus. feed | 0.05%-Bacillus. feed | Basic Feed |
| --- | --- | --- | --- |
| Number of mother sows (heads) | 4 | 4 | 4 |
| Period of Breast-feeding of piglets (days) | 25 | 25 | 25 |
| Mean body weight of each piglet at the start of the test (kg/head) | 1.475 | 1.492 | 1.443 |
| Mean body weight of each piglet at the end of the test (kg/head) | 6.451 | 6.663 | 5.731 |
| Mean increase in body weight (kg/head/days) | 0.199 | 0.207 | 0.171 |
| Percentage of piglets suffering from diarrhea | 14.3 | 11.0 | 21.3 |

Next, 8 mother sows of 2 to 6 time-multiparous Landrace females, pregnant as a result of crossing with Large White males, were grouped into two groups each comprising 4 heads. They were fed with either the 0.01% Brevibacterium-containing feed or the basic feed throughout pregnancy and the breast-feeding period. The increase in body weight of piglets, the occurrence of diarrhea in the piglets, and the percentage of the dead piglets at farrow and during their breastfeeding period were monitored. The results are present in Table 4.

TABLE 4

| Feed | 0.01%-Brevi. feed | Basic feed |
| --- | --- | --- |
| Number of mother sows (heads) | 4 | 4 |
| Total of litters from all mother sows (heads) | 43 | 41 |
| Number of stillbirths | 0 | 4 |

TABLE 4-continued

| Feed | 0.01%-Brevi. feed | Basic feed |
| --- | --- | --- |
| (heads) | | |
| Number of piglets at the start of the test (heads) | 43 | 37 |
| Number of piglets at the end of the test (heads) | 43 | 33 |
| Mean body weight of piglets at the start of the test (kg/head) | 1.50 | 1.50 |
| Mean body weight of piglets at the end of the test (kg/head) | 6.55 | 6.26 |
| Increase in mean body weight (kg/head/day) | 0.202 | 0.190 |
| Percentage of piglets suffering from diarrhea (%) | 4.7 | 40.5 |
| Percentage of piglets stillborn (%) | 0 | 9.8 |
| Percentage of piglets dying during the test (%) | 0 | 10.8 |

From the above experimental data, it is clear that administration of the feed composition of the present process to pregnant sows and mother sows throughout pregnancy and the breast-feeding period results in a sharp decrease in the percentage of stillborn piglets and of piglets dying during the breast-feeding period, a reduction in the occurrence of diarrhea in piglets during the breast-feeding period, and an increase in body weight of piglets.

Feeding the feed composition of the present process to pregnant sows and mother sows results in a lowering of the percentage of piglets dying at farrow and during the breast-feeding period, a reduction in the occurrence of diarrhea during the breast-feeding period, and an increase in body weight of piglets.

Obviously, numerous modifications and variations of the present invention are possible in light of the above teachings. It is therefore to be understood that within the scope of the appended claims, the invention may be practiced otherwise then as specifically described herein.

What is claimed as new and desired to be secured by Letters Patent of the United States is:

1. A method for decreasing piglet mortality at birth comprising administering to a pregnant sow a feed composition comprising at least one component selected from the group consisting of sterilized bacterial cells, disrupted cell fragments obtained by mechanical disruption or enzymatic digestion of said sterilized bacterial cells, and a cell wall component-containing fraction obtained by fractionating said disrupted bacterial cell fragments, wherein said bacterial cells are at least one member selected from the group consisting of the genus Bacillus, the genus Brevibacterium, and the genus Corynebacterium.

2. The method of claim 1, wherein said feed composition is administered daily to a pregnant sow at least one week prior to delivery of piglets.

3. The method of claim 2, wherein said bacterial cells are at least one bacterial species selected from the group consisting of *Bacillus subtilis, Brevibacterium lactofermentum, Brevibacterium flavum, Brevibacterium divaricatum, Corynebacterium glutamicum,* and *Corynebacterium acetoacidophilum.*

4. The method of claim 3, wherein said bacterial cells are at least one member selected from the group consisting of *Bacillus subtilis* ATCC 13952, *Brevibacterium lactofermentum* ATCC 13869, *Brevibacterium flavum* ATCC 14067, *Brevibacterium divaricatum* ATCC 14020, *Corynebacterium glutamicum* ATCC 13032, *Corynebacterium glutamicum* ATCC 13060, and *Corynebacterium acetoacidophilum* ATCC 13870.

5. The method of claim 1, wherein said bacterial cells are of a bacterium of the genus Bacillus.

6. The method of claim 1, wherein said bacterial cells are of a bacterium of the genus Brevibacterium.

7. The method of claim 1, wherein said bacterial cells are of a bacterium of the genus Corynebacterium.

8. The method of claim 1, wherein said bacterial cells are of *Bacillus subtilis.*

9. The method of claim 1, wherein said bacterial cells are of *Brevibacterium lactofermentum.*

10. The method of claim 1, wherein said bacterial cells are of *Brevibacterium flavum.*

11. The method of claim 1, wherein said bacterial cells are of *Brevibacterium divaricatum.*

12. The method of claim 1, wherein said bacterial cells are of *Corynebacterium glutamicum.*

13. The method of claim 1, wherein said bacterial cells are of *Corynebacterium acetoacidophilum.*

* * * * *